US011195150B1

United States Patent
McGovern

(10) Patent No.: US 11,195,150 B1
(45) Date of Patent: Dec. 7, 2021

(54) THREE-WAY EXCHANGE SYSTEM FOR RAISING FUNDS FOR PROJECTS

(71) Applicant: Paul McGovern, Oregon House, CA (US)

(72) Inventor: Paul McGovern, Oregon House, CA (US)

(*) Notice: Subject to any disclaimer, the term of this patent is extended or adjusted under 35 U.S.C. 154(b) by 0 days.

(21) Appl. No.: 16/600,497

(22) Filed: Oct. 12, 2019

Related U.S. Application Data

(60) Provisional application No. 62/746,508, filed on Oct. 16, 2018.

(51) Int. Cl.
| | |
|---|---|
| *G06Q 10/10* | (2012.01) |
| *G06Q 10/06* | (2012.01) |
| *G06Q 30/08* | (2012.01) |
| *G06Q 30/02* | (2012.01) |
| *G06Q 10/00* | (2012.01) |
| *G06N 5/04* | (2006.01) |
| *G06N 20/00* | (2019.01) |

(52) U.S. Cl.
CPC .......... *G06Q 10/1053* (2013.01); *G06N 5/04* (2013.01); *G06N 20/00* (2019.01)

(58) Field of Classification Search
CPC .. G06Q 10/1053; G06Q 30/0279; G06N 5/04; G06N 20/00
USPC ................. 705/1.1–912, 321, 329
See application file for complete search history.

(56) References Cited

U.S. PATENT DOCUMENTS

| | | | |
|---|---|---|---|
| 8,725,653 B1 | 5/2014 | Hernandez et al. | |
| 9,691,087 B2 | 6/2017 | Sobhani | |
| 9,875,513 B2 | 1/2018 | Zhou | |
| 2005/0144120 A1* | 6/2005 | Flake | G06Q 20/10 705/39 |
| 2009/0192873 A1 | 7/2009 | Marble | |
| 2013/0204801 A1* | 8/2013 | Downs | G06Q 30/0279 705/329 |
| 2014/0074665 A1* | 3/2014 | Stewart | G06Q 30/0279 705/27.1 |
| 2015/0051995 A1* | 2/2015 | Courtney | G06Q 30/0601 705/26.1 |
| 2016/0180282 A1 | 6/2016 | Basalamah et al. | |
| 2017/0109800 A1* | 4/2017 | Heitmann | G06Q 30/0279 |
| 2017/0330148 A1 | 11/2017 | Griffith | |

\* cited by examiner

*Primary Examiner* — Jonathan P Ouellette
(74) *Attorney, Agent, or Firm* — Chad Peterson

(57) ABSTRACT

Methods, systems and apparatuses, including computer programs encoded on computer storage media, are provided for managing contributions to projects via a three-way exchange platform. A project manager uploads project details, which are stored and published on the platform. An expert who wants to contribute services to the project uploads details of the service(s), which are stored and published on the platform. The expert also indicates support for the project. A patron who needs the services of the expert hires the expert through the platform. After the expert has completed the requested services, the patron funds the project supported by the expert in addition to or instead of the expert.

14 Claims, 12 Drawing Sheets

FIG. 12

THREE-WAY EXCHANGE SYSTEM FOR RAISING FUNDS FOR PROJECTS

CROSS-REFERENCE TO RELATED APPLICATIONS

The present application claims benefit of U.S. provisional patent application Ser. No. 62/746,508, titled "SYSTEMS AND METHODS FOR RAISING FUNDS FOR PROJECTS," filed Oct. 16, 2018, which is incorporated by reference herein in its entirety.

BACKGROUND

Crowdfunding is the practice of raising funds for a venture, application, or other project by soliciting and receiving contributions from a large number of people, typically via the internet. There are generally three types of entities involved in a crowdfunding project, a project manager who initiates the crowdfunding project and creates the project description on the crowdfunding service; individuals or groups who contribute money to the project; and the crowdfunding service that brings the other parties together. One example of a crowdfunding system is kickstarter.com. However, current crowdfunding systems are limited to accepting monetary contributions, and are not capable of accepting donations of time.

In addition, certain systems allow for individuals or groups with skills helpful to the completion of a project to contribute those skills to the project. However, individuals and groups without the required skills are unable to contribute their time to the project, even when they want to support the project in a non-financial manner.

Therefore, it would be advantageous if there was a platform that allowed individuals or groups that wanted to support a crowdfunding project by donating their time, rather than their money, could do so. It would be further advantageous if such a system allowed the donations of time even when the supporting individuals or groups do not have the skills necessary to directly participate in the completion of the project.

SUMMARY

In accordance with the foregoing objectives and others, exemplary methods and systems are disclosed herein to enable the crowdfunding of projects via a three-way exchange platform, bringing together project managers, patrons, and experts to fund the projects. In general, project managers post projects to the system, including information about the project. Afterwards, entities who would like to support a particular project (also known herein as "experts") post services that they are able to provide, and select the particular projects (or types of projects) that they are interested in supporting. Then other entities that need the services provided by the experts (also known herein as "patrons") hire the experts to perform the offered services. After the experts complete the services, the patrons fund the project instead of (or in addition to) paying the expert for the work performed. Unlike conventional crowdfunding systems, the disclosed 3-way exchange platform allow for individuals to contribute to a project by donating their time, even when their skills aren't a direct match for the skills required to complete the project.

In some embodiments, patrons can post requests for services they need performed, and experts can respond to the service requests using, e.g., bids. After the service is performed, the requesting patron funds a project supported by the expert instead of (or in addition to) paying the expert for the service.

In one embodiment, the present application is directed to a computer program product encoded on one or more non-transitory computer storage media, the computer program product comprising instructions that when executed by one or more processors cause the one or more processors to perform operations comprising: receiving information related to a project; transmitting the information related to the project to a first user device for display to an expert; receiving an indication that the expert supports the project; receiving information related to a service offered by the expert; transmitting the information related to the service to a second user device for display to a patron; receiving an indication that the patron wants to hire the expert to perform the service; receiving an indication that the expert has performed the service for the patron; and transferring an agreed monetary amount from an account of the patron to an account related to the project.

In an alternative embodiment, the present application is directed to a computer program product encoded on one or more non-transitory computer storage media, the computer program product comprising instructions that when executed by one or more processors cause the one or more processors to perform operations comprising: receiving information related to a project; transmitting the information related to the project to a first user device for display to an expert; receiving an indication that the expert supports the project; receiving information related to a service request from a patron; transmitting the information related to the service request to the first user device for display to the expert; receiving an indication that the expert is able to perform the service for the patron; receiving an indication that the patron wants to hire the expert to perform the service; receiving an indication that the expert has performed the service for the patron; and transferring an agreed monetary amount from an account of the patron to an account related to the project.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 12 shows an embodiment of a service request screen according to one aspect of the present disclosure.

DETAILED DESCRIPTION

The systems and methods of the present disclosure provide a 3-way exchange platform for crowdfunding projects that can be funded by a combination of monetary contributions and donations of time.

As used herein, "project" refers to the projects posted by project managers, who are looking for funding from other members of the crowdfunding community, e.g., patrons. The project manager is responsible for defining and posting the project on the system and, after the project has been funded, staffing and completing the project with the provided funding.

Experts include individuals and organizations with specific skills they want to offer on the crowdfunding system for the purpose of supporting one or more projects, e.g., a local or cause-based project. In general, experts want to donate some or all of their time to support one or more specific projects (or project categories) listed on the crowdfunding system.

Patrons include individuals and organizations that need certain services performed by experts. Some patrons may also want to lend their support to one or more specific projects, e.g., a local or cause-based project, or project categories, listed on the crowdfunding system.

Figure 1:
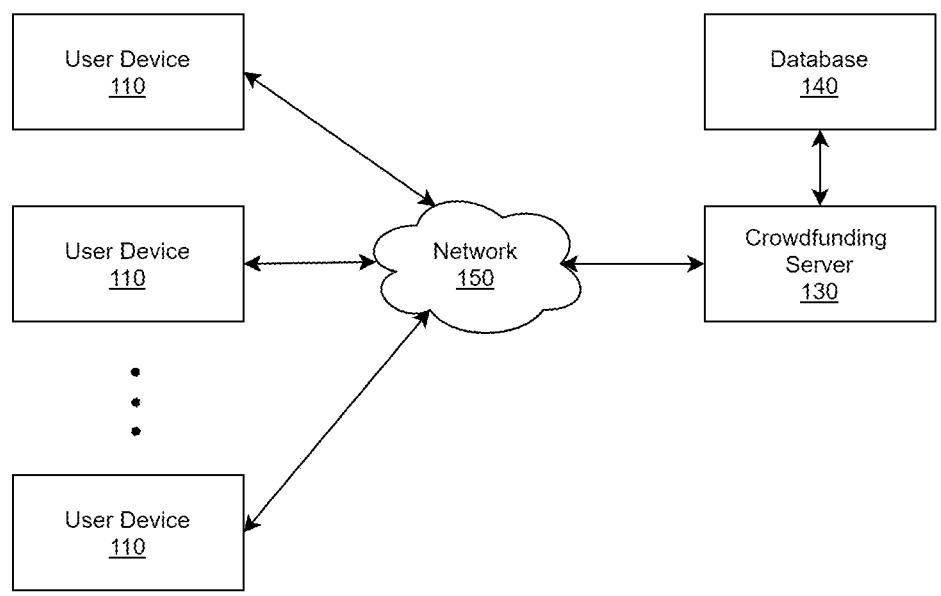
FIG. 1 shows one embodiment of a system according to one aspect of the present disclosure.

Referring to FIG. 1, a block diagram of an exemplary crowdfunding system is illustrated. The crowdfunding system may include user devices 110 and one or more crowdfunding servers 130. The user devices and crowdfunding server(s) may be remote from each other and interact through a communication network 150. Non-limiting examples of communication networks include local area networks (LANs), wide area networks (WANs) (e.g., the Internet), etc.

The crowdfunding server 130 is adapted to receive, determine, store, and/or transmit user information for any number of users (e.g., project managers, patrons, experts, etc.). Such information may be manually entered or selected by a user via an online, mobile, or desktop application. The crowdfunding system may store received or determined user information in, for example, a database 140.

The crowdfunding server 130 may also be adapted to receive, determine, store, and/or transmit information regarding projects, services, and/or service requests, posted by project managers, experts, and/or patrons. Such information may be manually entered or selected by a user via an online, mobile, or desktop application. The crowdfunding server may store received or determined information in, for example, a database 140.

In certain embodiments, a user may access the crowdfunding server 130 via a user device 110 connected to the network 150. A user device 110 may be any computer device capable of accessing the crowdfunding server 130, such as by running a client application or other software, like a web browser, web-browser-like application, mobile app, etc. User devices include, but are not limited to, mobile telephones, desktop computers, laptop computers, smart phones, tablets, etc. Generally, the client application will provide appropriate functionality (as described herein) for each type of user, so project managers, patrons, and experts may each access the crowdfunding server 130 via a similarly-configured user device 110.

The client application may be adapted to present various user interfaces to users. Such user interfaces may be based on information sent by the crowdfunding server 130, and may allow the user to send and receive data. Each client application may comprise HTML data, images, videos, icons, and/or executable code. The executable code may be composed in JavaScript, ECMAscript, coffeescript, python, Ruby or any other programming languages suitable for execution within the client application, or translation into a client application executable form. In one embodiment, the crowdfunding server 130 may provide for each of project managers, patrons, and experts a specific interface.

In selected embodiments, each user (e.g., project manager, expert, or patron) may be required to register an account on the crowdfunding system. Users may be required input user information, e.g., user identification information (e.g., name, screen name, image, bio, etc.); user authentication information (e.g., account name, password, third-party authentication information (e.g., OAuth, Google Sign-In, Security Assertion Markup Language (SAML) Single-Sign On (SSO))); and/or contact information (e.g., email address, mailing address and/or other location information (e.g., zip code), phone number, etc.). Users may also be required to input financial account information if they want to fund projects and/or receive payment for services performed for patrons.

To collect information from the user, the system may provide the user with a webpage or other interface containing text and numerical fields for the user to fill in. Entered user information will be stored by the crowdfunding server 130 in the database 140.

In one embodiment, the database 140 may also store a type associated with each user, e.g., patron, expert, or project manager. In one embodiment, each user may be assigned any combination of available types, for example if the same individual manages one or more projects, is a patron for one or more additional projects, and contributes his or her time to other projects as an expert.

In one embodiment, any user may post projects, service offerings, or service requests, making a type field unnecessary.

The crowdfunding system may also store information about organizations, e.g., umbrella organizations that support the project manager. Each project manager may be connected to such an organization in the crowdfunding system. The stored organization information may include, e.g., name, description, contact information, geographical location, etc., and may be displayed to users viewing information about a project. The connection to an umbrella organization may increase user trust in the project manager's ability to complete the project.

Once registered, a user may post projects, service offerings, and/or service requests. Users may also search for projects, service offerings, and/or service requests. For example, experts and/or patrons may search for projects they would like to support. The client application is configured to allow patrons and experts to select projects and/or categories of projects that they are interested in supporting. The selected project and/or project categories are stored in the database 140.

The client application is configured to allow a project manager to send information regarding a project to the crowdfunding server 130 via the network 150. The project manager may be an individual or representative of an organization (e.g., non-profit organization, a small business, etc.). The project information may include details of the project, such as the project name, description (including how the raised funds will be used), project categories, location, deadline by when the project needs to be completed, the amount of time needed to complete the project, fundraising goals (monetary amount and timeline by when the specified amount is needed), the organization supporting the project, etc.

After the project information is received by the crowdfunding server 130, it may be reviewed to determine if it meets certain requirements of the system. For example, the system may require that a project fundraising goal not exceed a threshold amount, that the project deadline is not too soon or too far in the future, that the project is consistent with the goals of the crowdfunding system, etc. If it is determined that the project meets the requirements, the project may then be published, e.g., on a website controlled by the crowdfunding system. The project information is also stored in the database 140. Other members of the crowdfunding community (e.g., patrons and experts) are then able to view the project and select it as a project they want to support.

In some embodiments, after the project is posted, experts and/or patrons that have previously indicated that they support projects in the project category of the new project are notified of the new project, and given the option to select the new project as a supported project. In addition, users may be notified of the new project based on the users' history of interaction with the system. For example, an expert that has previously supported projects with a similar description as the new project may be automatically informed of the new project. One or more machine learning and/or natural language processing techniques (e.g., naïve Bayes classifiers, artificial neural networks, support vector machines, latent semantic indexing, etc.) may be used to make these automatic project suggestions. Such techniques may also be used to suggest services, experts, project managers, organizations, causes, etc., that may of interest to any user based on prior searches, support, or other transactions with the system.

The client application is also configured to allow experts to post service offerings describing the types of services they can provide to patrons. Service offerings include any type of service, including the use of property or other assets. Information regarding the service offerings may include a service description, a service category, the type of billing (e.g., hourly rate, fixed price, etc.), the rate (for hourly services) or the fixed amount (for fixed price services), the experience of the expert with respect to the offered service, the expert's availability, the expert's credentials, etc. After a service offering is posted, it is stored in the database 140, and other users, e.g., patrons, can search for and/or browse the service offerings and identify services that they need from experts. The patrons may also view the projects and/or project categories that the experts support.

In one embodiment, patrons may be notified of a new service offering based on the patron's history of interaction with the system. For example, a patron that has previously hired experts offering a service with a similar description as the new service offering may be automatically informed of the new service offering. One or more machine learning and/or natural language processing techniques (e.g., naïve Bayes classifiers, artificial neural networks, support vector machines, latent semantic indexing, etc.) may be used to make these automatic service offering suggestions.

After browsing the available services, a patron may hire an expert through the crowdfunding system. During the hiring process, the patron and expert agree on the project that will be supported by the expert's services. For example, if the expert has selected several supported projects, the patron may identify a particular one of the projects to support. If the expert supports multiple projects, the patron may be prompted to select from among the projects supported by the expert. If the expert has not selected a supported project, the patron may be prompted to select a project to support.

After the service is completed by the expert, the patron and/or the expert notifies the system of the completion of the service, and the system transfers the contracted contribution from the patron to an account related to the selected project. If the parties agreed for the expert to receive part of the payment, the system also makes the necessary transaction.

In an alternative embodiment, the client application is configured to allow patrons to post requests for services that the patrons need performed, and for experts to view and bid on or otherwise respond to the posted requests. A service request may include a description of the service, type of billing (e.g., hourly rate, fixed fee, etc.), a range of desired rates (for hourly services) or fixed amounts (for fixed price services), necessary expertise and/or credentials for the expert, etc. After the service request is posted to the crowdfunding system, experts can search for and bid on or otherwise respond to the service request.

In some embodiments, a patron may specify supported projects and/or project categories (i.e., projects/project categories the patron supports), and experts can view the projects and/or categories supported by the patron, and may take that into consideration when bidding on or responding to service requests. In general, though, patrons are more likely to have service requests met if the project being supported is selected by the expert.

The client application is further configured to allow patrons to select a bid (or other response) and hire the selected expert. During the hiring process, the patron and expert agree on the project that will be supported by the expert's service. For example, if the expert supports several projects with the same service, the patron may identify a specific project to support when agreeing on a transaction with the expert for the service. If the expert has not selected any projects supported by the service, the patron may be prompted to select a project to support.

As above, after the service is completed by the expert, the system transfers the contracted contribution from the patron to one or more accounts related to the selected project and/or the expert.

Figure 2:
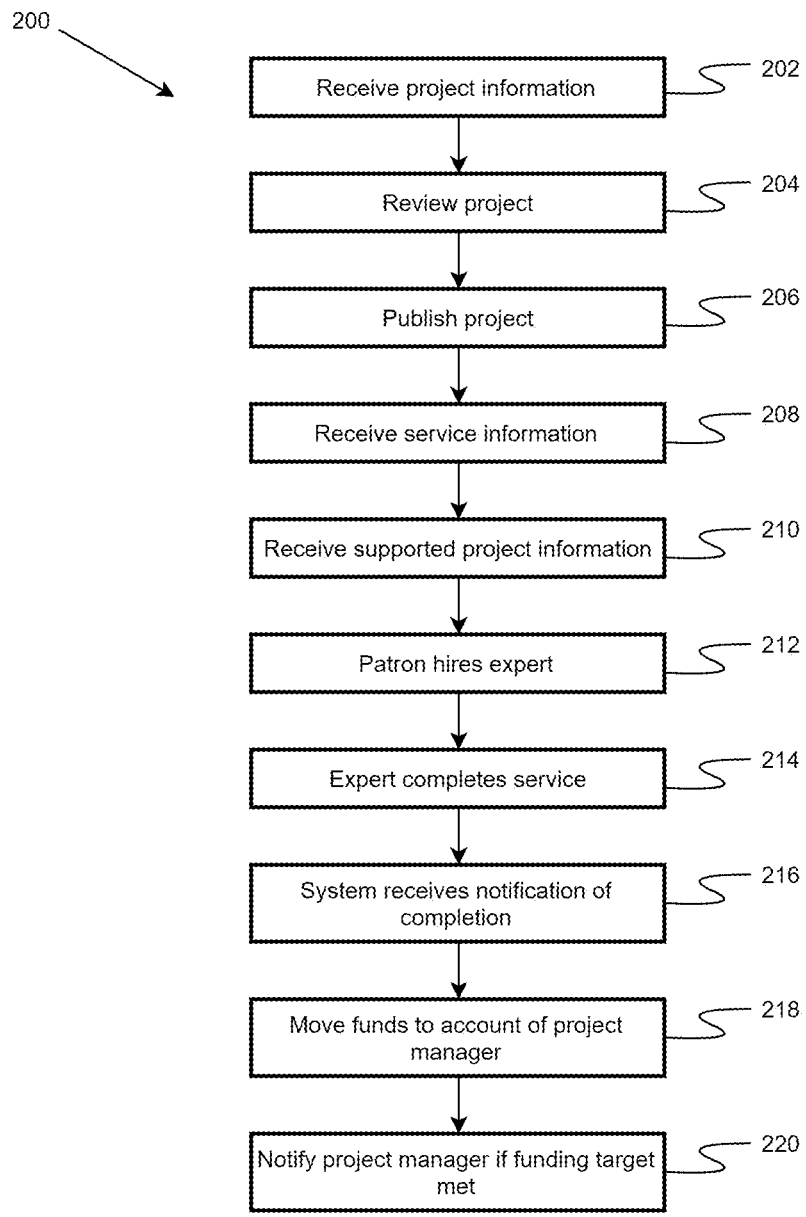
FIG. 2 shows an embodiment of a method for making a contribution to a project according to one aspect of the present disclosure.

FIG. 2 is a flow chart illustrating a method 200 for making a contribution to a project according to one example. At step 202, the crowdfunding server 130 receives information regarding a project, e.g., from a project manager, via the network 150.

At step 204, the project may be reviewed to determine if it meets the requirements of the crowdfunding system.

Figure 4:
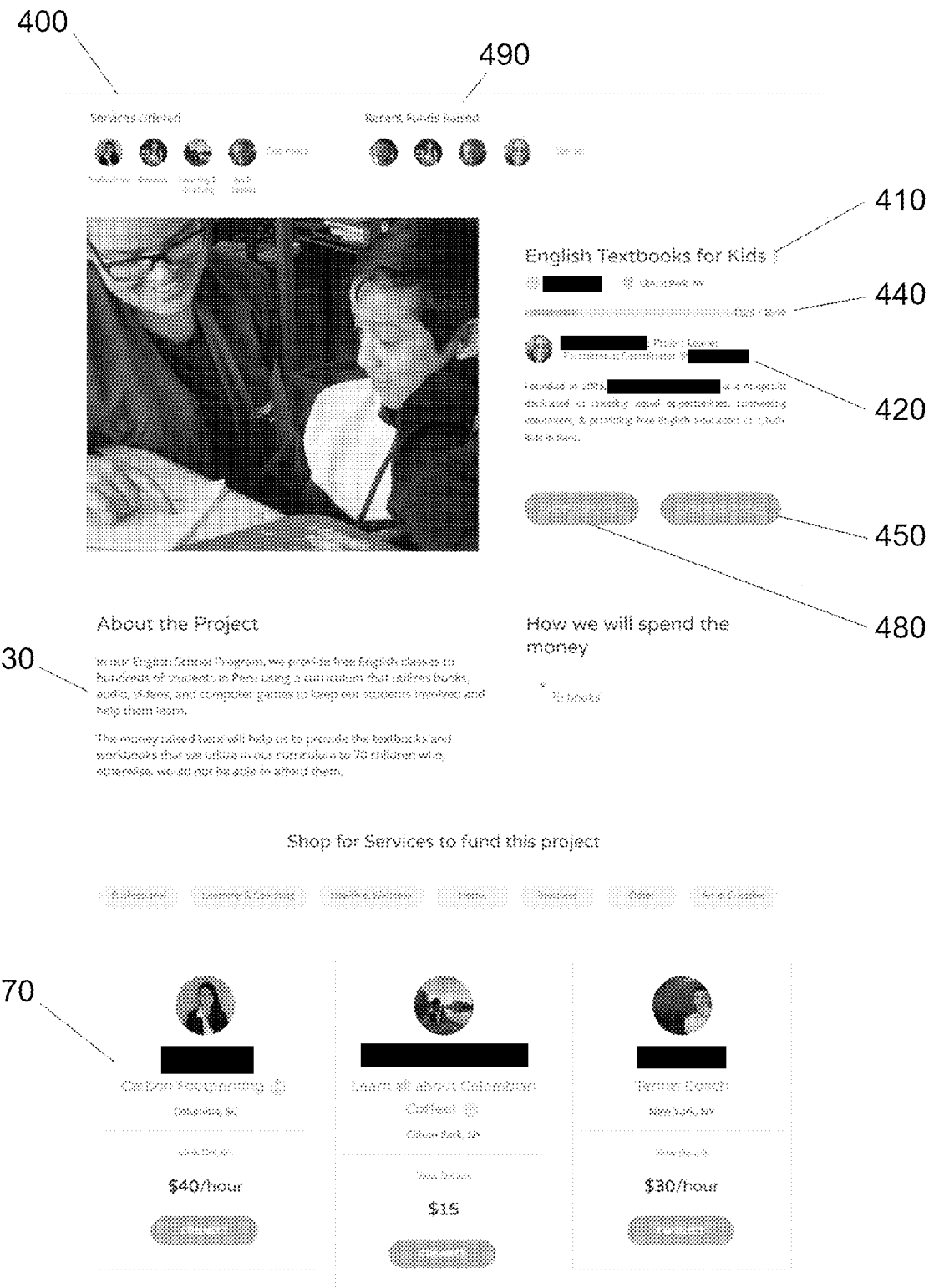
FIG. 4 shows an embodiment of a project information screen according to one aspect of the present disclosure.

At step 206, the project is published to the crowdfunding system. The project may be published online through a website hosted on the crowdfunding server 130. The website may alternatively be hosted by a third party provider. FIG. 4 shows an example project information screen 400, showing the details regarding a project. FIG. 4 includes the project title 410, the project manager 420, the project description 430, the funding amount needed and the current total funds raised 440, and list of recent supporters of the project 490, which can be selected to show a full list of project supporters.

The project information screen also includes several interface elements to allow users to support a project. For example, patrons can review the services offered by experts in support of the project at available services section 470. In one embodiment, shop services button 480 links to this section. By selecting offer services button 450, experts can indicate that they want to support the project with their services, and they will then be listed in available services section 470.

Figure 5:
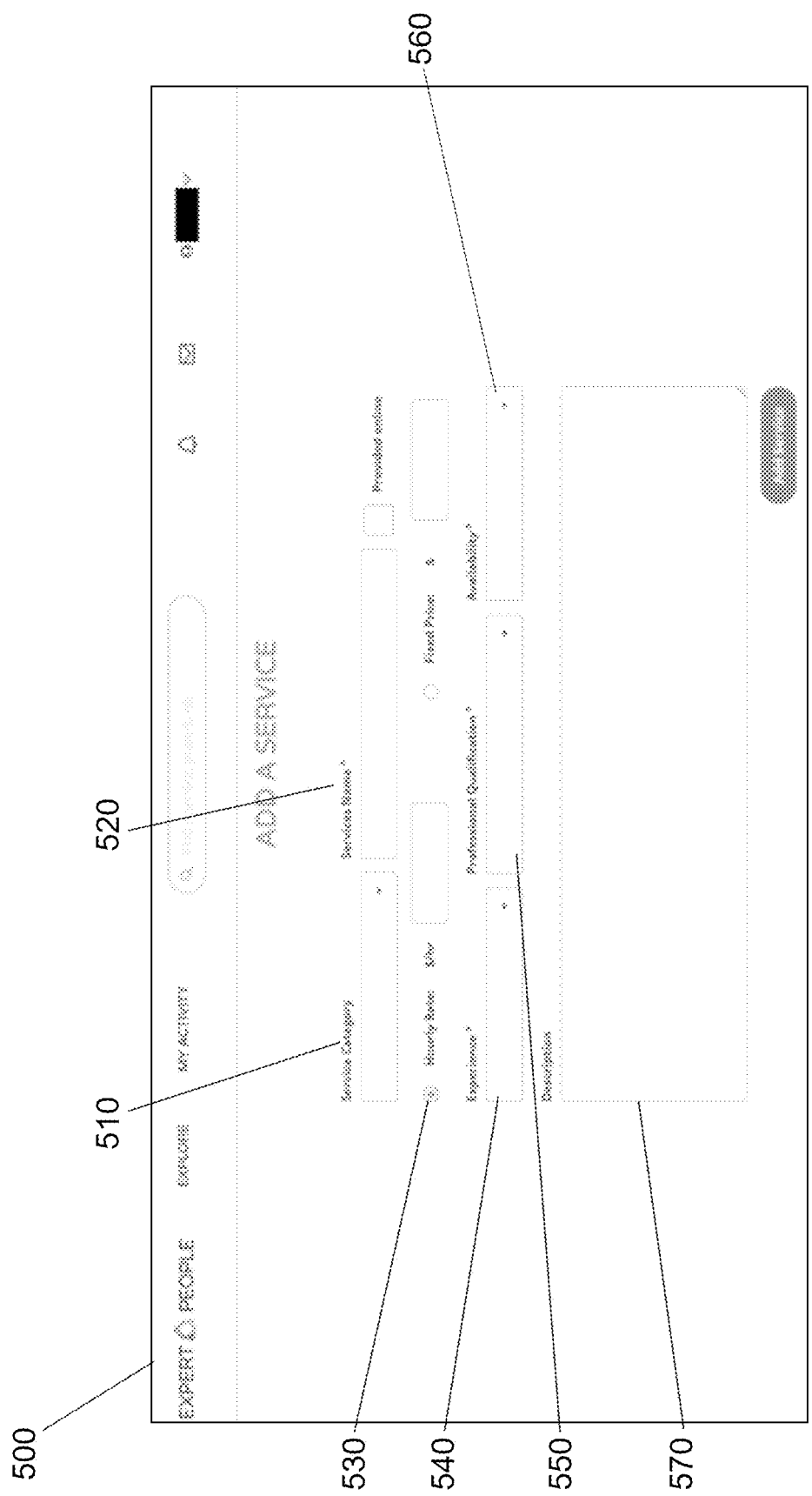
FIG. 5 shows an embodiment of a service information input screen according to one aspect of the present disclosure.

At step 208, the crowdfunding server 130 receives information regarding a service offering of an expert. In one embodiment, the expert may use an online form, e.g. service information input screen 500 shown in FIG. 5, to provide the information regarding the service offering. Such information may include the service category 510, service name 520, cost information 530, experience level of the expert 540 (e.g., number of years of experience), expert qualifications 550 (e.g., applicable industry certifications), expert availability 560 (e.g., how much time the expert is able to contribute), and service description 570.

Figure 6:
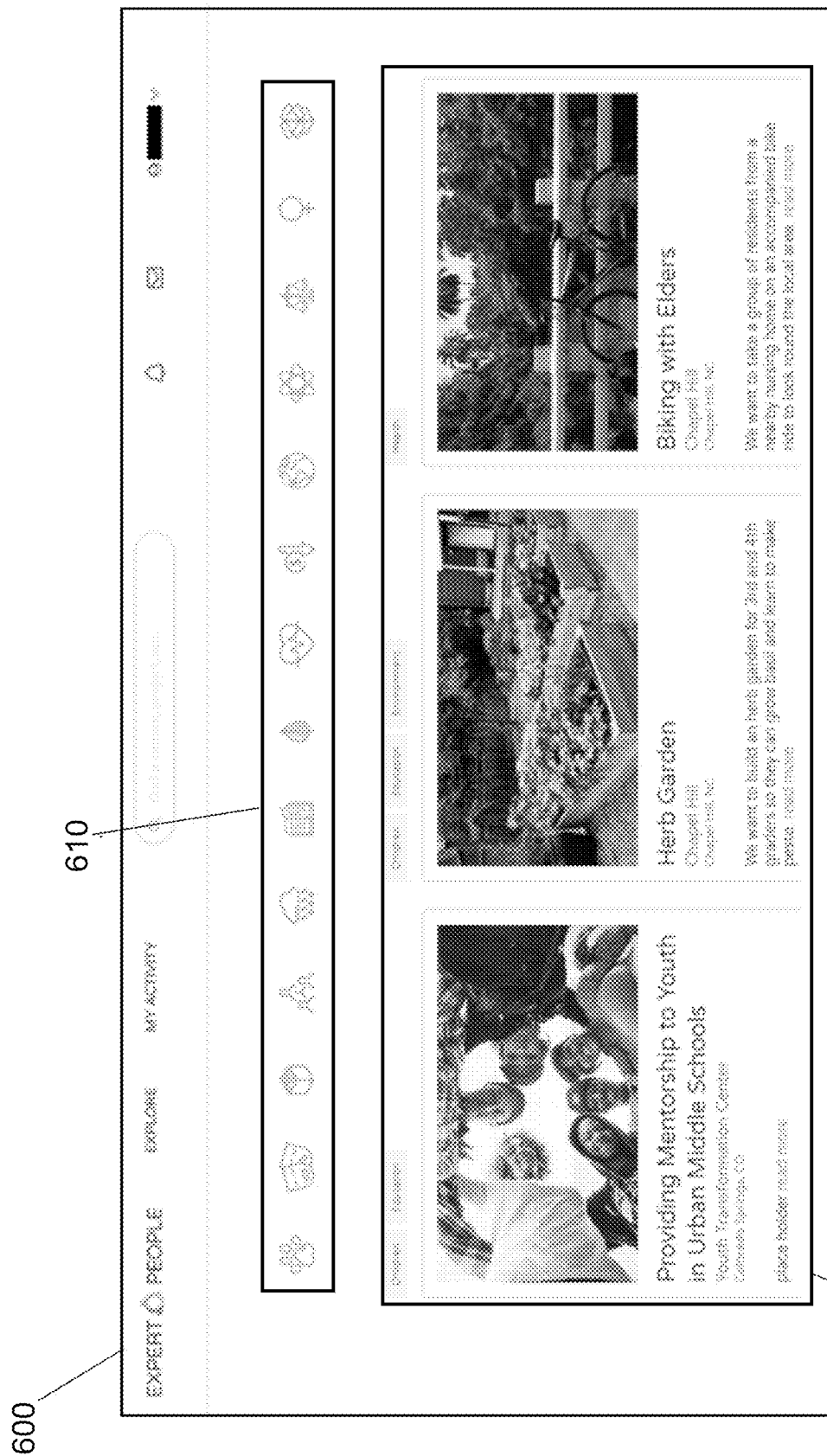
FIG. 6 shows an embodiment of a project search screen according to one aspect of the present disclosure.

At step 210, the crowdfunding server 130 receives information regarding one or more projects and/or categories of projects supported by the expert. In one embodiment, the expert may view a project search screen that shows available projects to support and allows the expert to search for projects. An example project search screen 600 is illustrated in FIG. 6, and includes a project category selection section 610, and a project display section 620.

After selecting a particular project, the expert may indicate support for a project by clicking a link (e.g., support project button 450) on a project information screen (e.g., project information screen 400 in FIG. 4). In an embodiment, the expert may select a different set of (i.e., one or more) supported projects for each service provided by the expert.

At step 212, a patron having a need for the service offered by the expert views the service offering and hires the expert. During the hiring process, the project that will be supported is determined.

Figure 7:
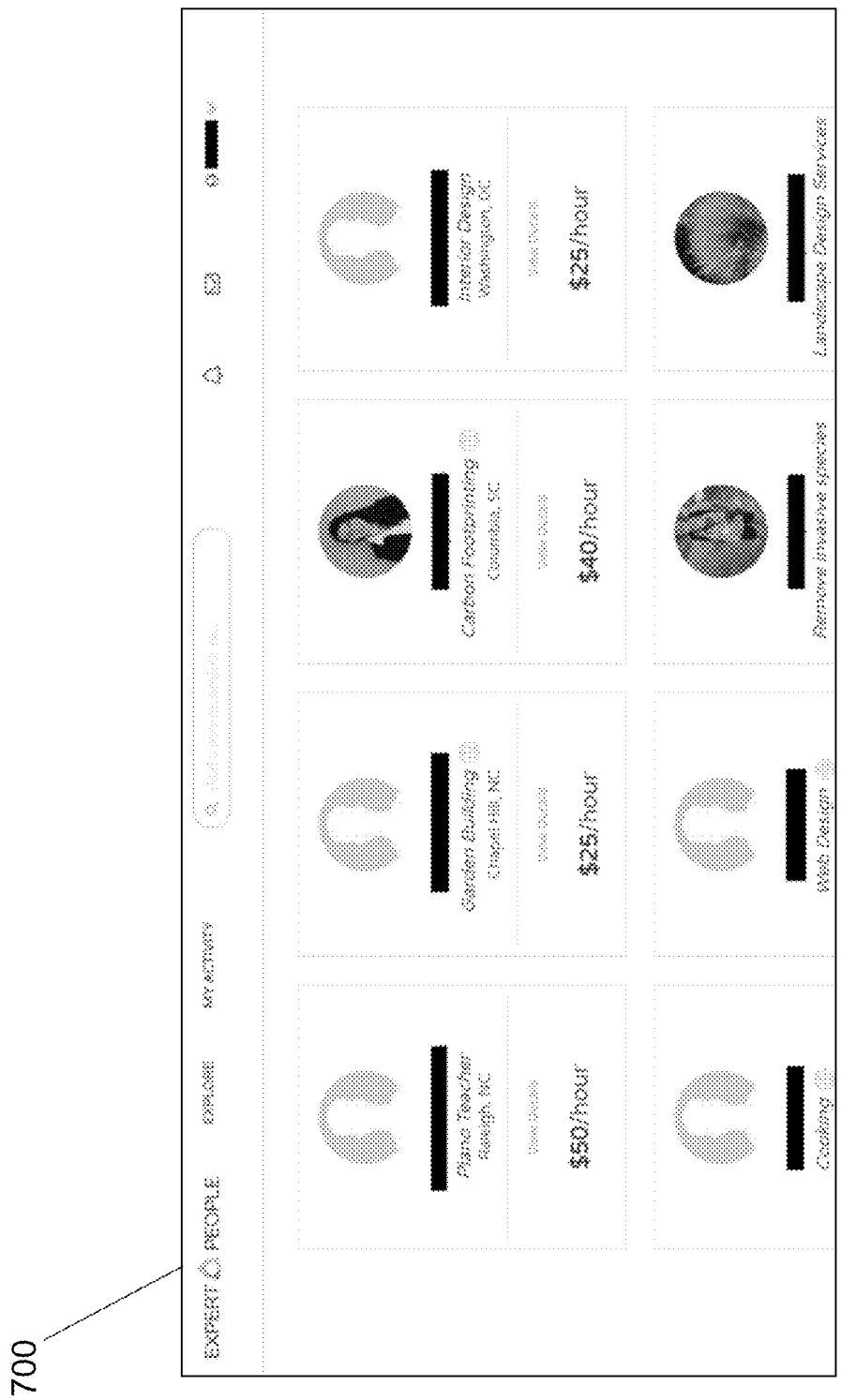
FIG. 7 shows an embodiment of a services screen according to one aspect of the present disclosure.

For example, the patron may view available services on a services screen 700, as illustrated in FIG. 7, and select a desired service. Alternatively, the patron may search for a project (as described above with respect to step 210) and select a project from the project search screen. After selecting a project, the patron may select from among the services provided by the experts supporting the project.

In one embodiment, the expert and/or the patron may unilaterally select the project that will be supported.

In one embodiment, experts may select a different set of supported projects for each service offered.

In one embodiment, the patron may select from among the projects supported by the expert. For example, FIG. 8 shows an expert hiring screen 800 that may be displayed to a user after a particular service has been selected, whether by searching for services specifically or by selecting from among services offered by experts supporting a particular project.

Figure 8:
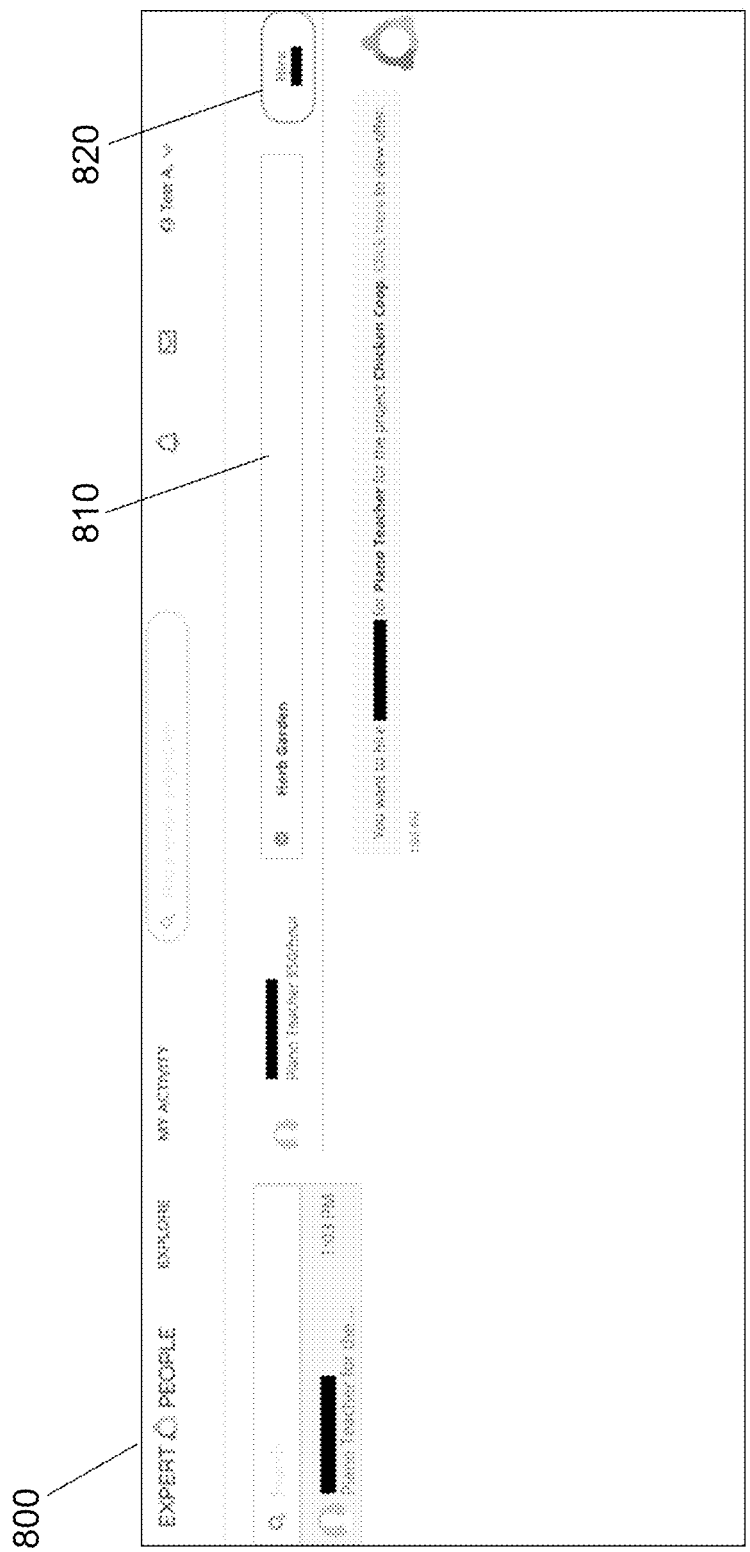
FIG. 8 shows an embodiment of an expert hiring screen according to one aspect of the present disclosure.
Figure 9:
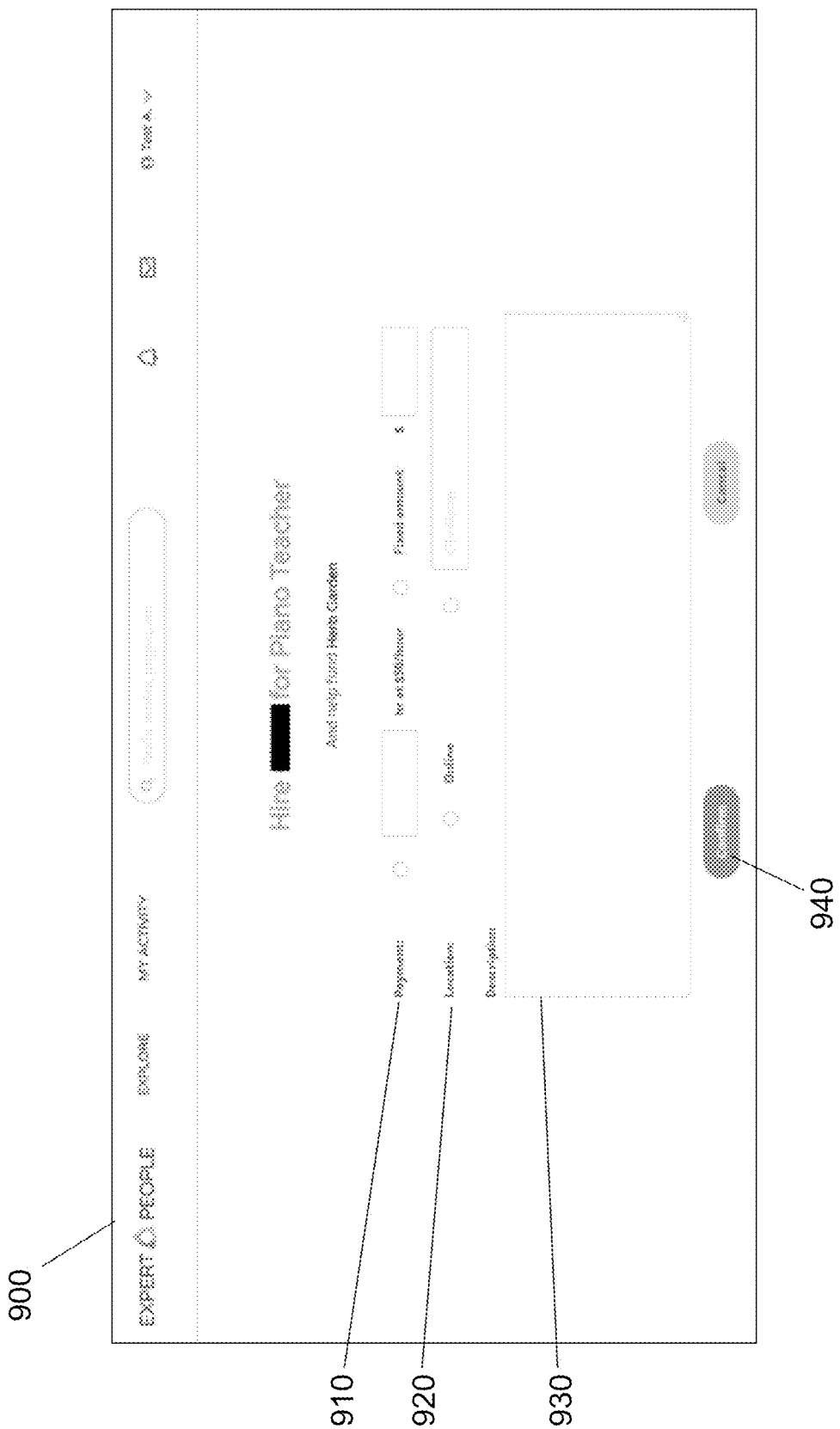
FIG. 9 shows an embodiment of an offer details input screen according to one aspect of the present disclosure.

In FIG. 8, the specific project may be selected by the patron using dropdown control 810, then the patron may start the hiring process by clicking hire button 820. After clicking the hire button, an offer details input screen may be displayed to the patron. An example offer details input screen 900 is illustrated in FIG. 9, and allows the details of the offer to be input by the patron. Offer details input screen 900 includes fields for payment details (e.g., hourly rate vs. fixed rate, dollar amount, etc.) 910, location 920 (e.g., online or the patron may specify using an input field), and description 930. After filling in the applicable fields, the patron may send the offer to the expert by clicking confirm button 940. The expert may then accept or decline the offer from the patron.

In one embodiment, the patron and the expert may also agree on payment split between the expert and the project, if the expert is unable to donate all of the time spent performing the service to the project. A minimum predefined amount, which may be defined as a fixed amount or a percentage, will always be allocated to the project.

At step 214, the expert completes the service according to the agreement between the patron and the expert.

Figure 10:
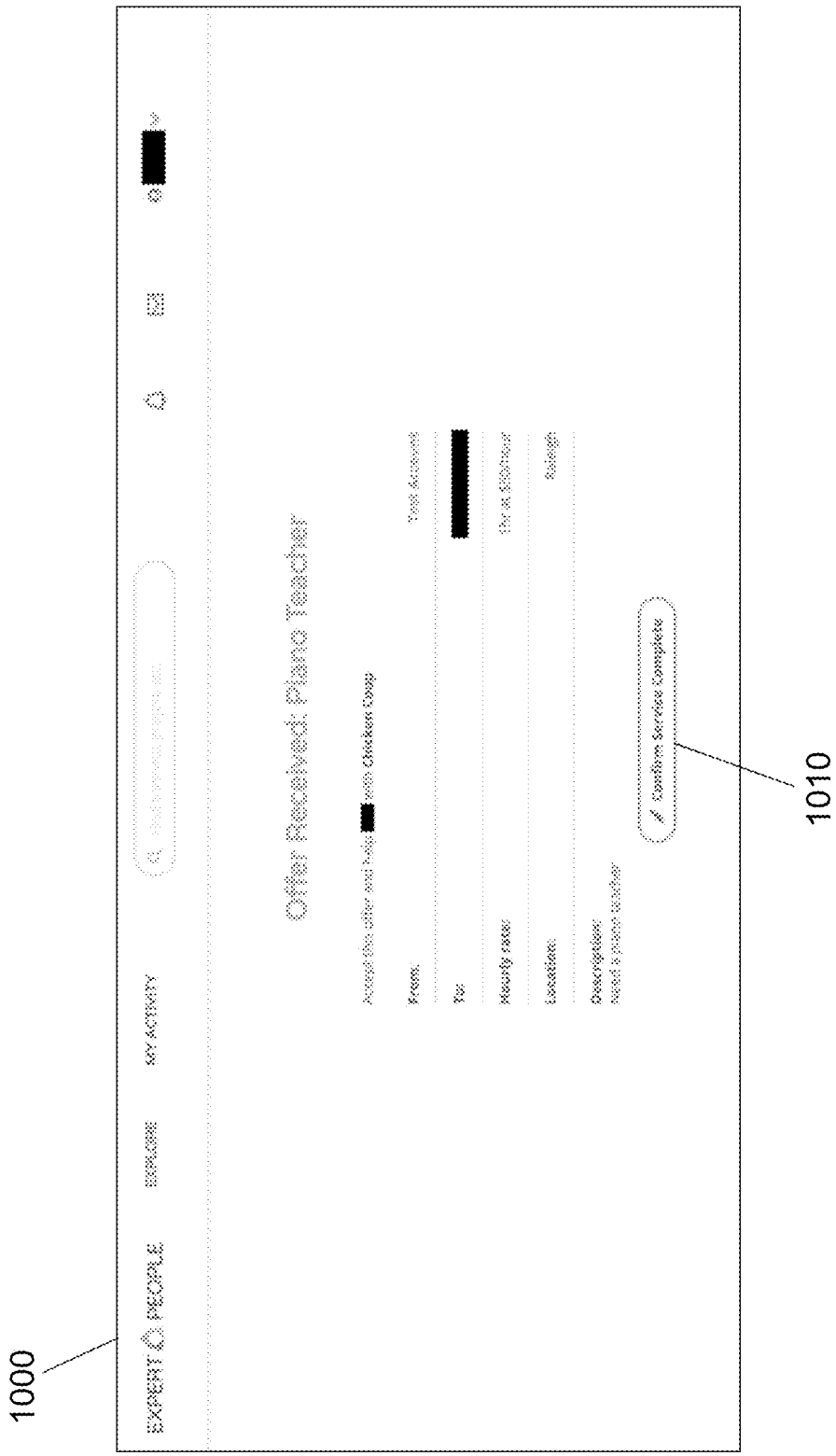
FIG. 10 shows an embodiment of an offer received screen according to one aspect of the present disclosure.

At step 216, the expert reports to the crowdfunding system that the service has been completed. For example, the expert may click the confirm service complete button 1010 on the offer received screen 1000, which is illustrated in FIG. 10. In some embodiments, the patron may also report to the system that the service has been completed.

At step 218, the system collects the agreed amount from the patron and deposits the agreed amount into the account related to the project, e.g., an account of the organization associated with the project manager. In situations where the expert will receive some of the funds from the patron, that amount is deposited into the expert's account.

At step 220, the system determines if the project has received the required funding and, if so, notifies the project manager accordingly.

After the project has been funded, the project manager will then apply the funding to the completion of the project.

Figure 11:
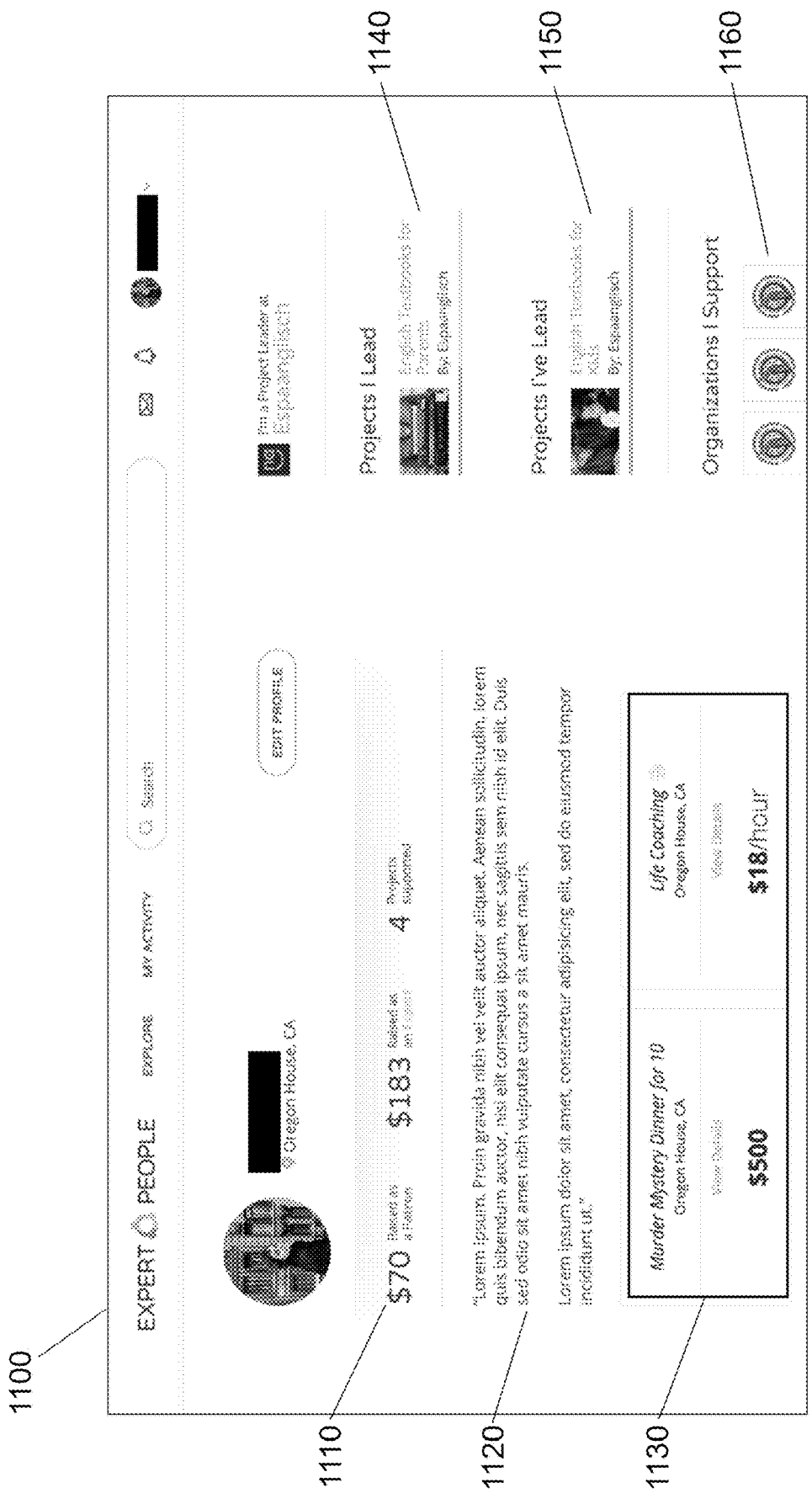
FIG. 11 shows an embodiment of a user profile screen according to one aspect of the present disclosure.

An example user profile page 1100 is illustrated in FIG. 11. The user profile page shows the amount raised by the user as both an expert and patron, and the number of projects supported in project support section 1110; the user description 1120; a section detailing the services offered by the user 1130 (for expert users); the projects currently managed by the user 1140 (for project manager users); the projects managed in the past by the user 1150 (for project manager users); and organizations supported by the user 1160. The user profile page may also display the specific projects the user has supported both as an expert and as a patron.

Figure 3:
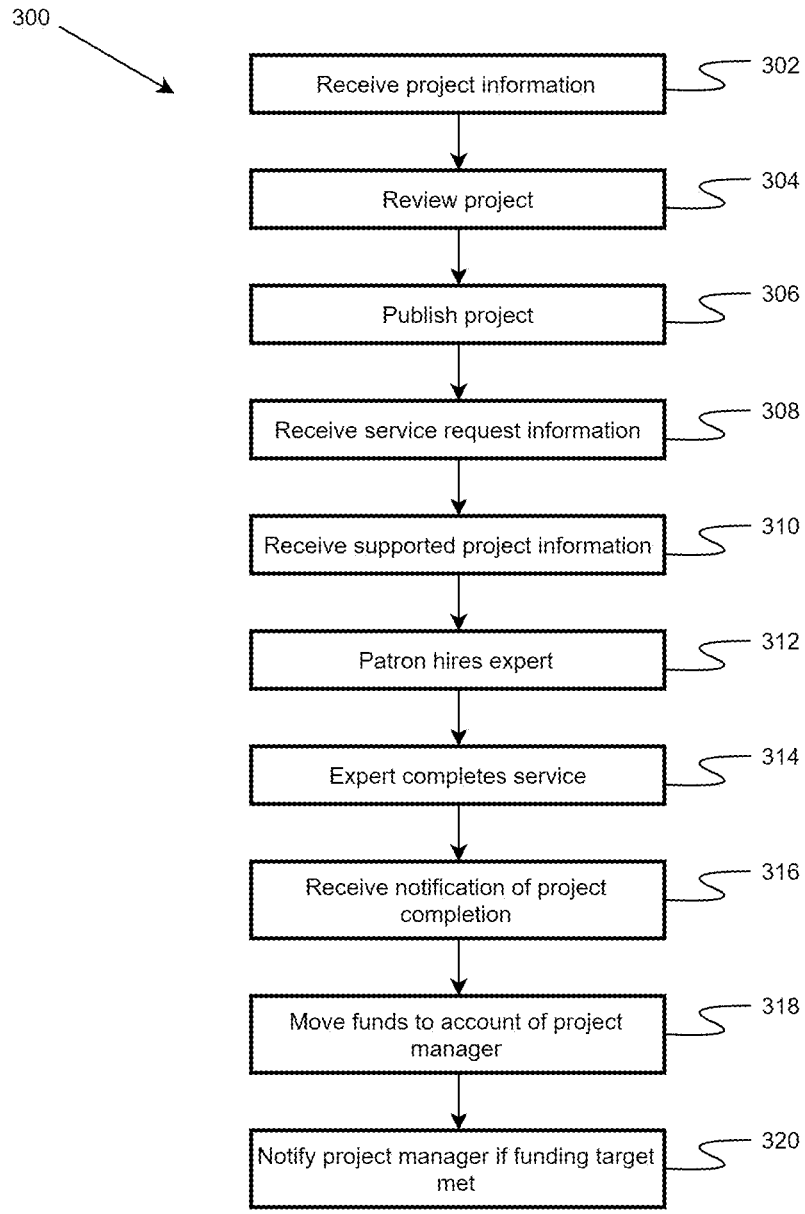
FIG. 3 shows an embodiment of a method for making a contribution to a project via a service request according to one aspect of the present disclosure.

FIG. 3 is a flow chart illustrating an alternative method 300 for receiving funding for a project, where a service request is made by a patron, e.g., for a service that may or may not be currently offered by an expert on the system. At step 302, the crowdfunding server 130 receives information regarding a project, e.g., from a project manager, via the network 150.

At step 304, the project may be reviewed to determine if it meets the requirements of the crowdfunding system.

At step 306, the project is published to the crowdfunding system. The project may be published online through a website hosted on the server 130. The website may alternatively be hosted by a third party provider. FIG. 4 illustrates an example project information screen, and is described above with respect to step 206.

Figure 12:
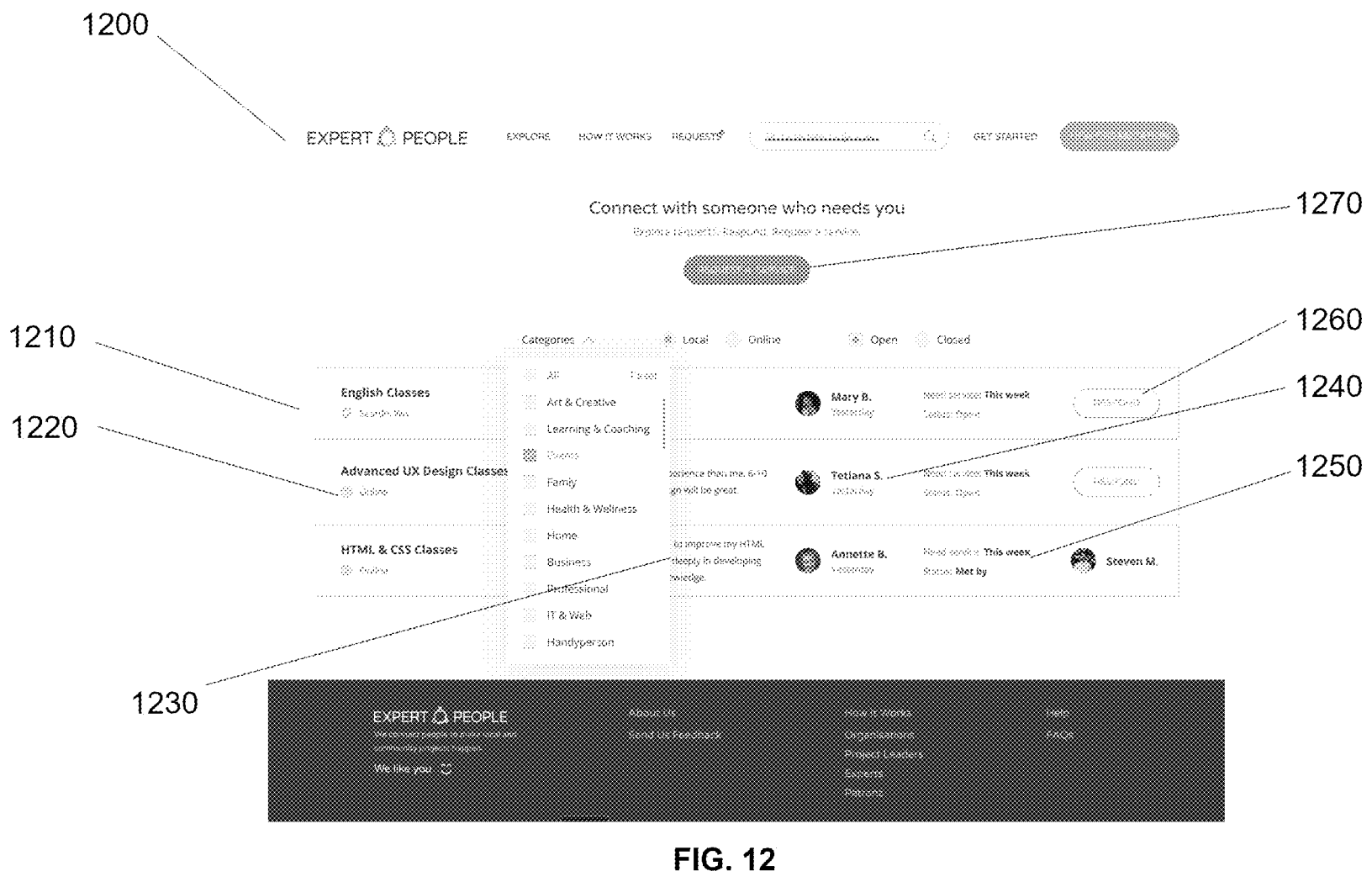

At step 308, the crowdfunding system receives information regarding a service request from a patron, e.g., by selecting request service button 1270 in FIG. 12.

At optional step 310, the crowdfunding server 130 receives information regarding one or more projects and/or categories of projects supported by the patron. In an alternative embodiment, the patron does not select any supported projects, allowing the expert meeting the service request to select the supported project.

At step 312, an expert that can perform the requested service views the service request and contacts the patron, who then hires the expert. An example service request screen is illustrated in FIG. 12. Requested services are shown in service request window 1210, which included the service request title 1220, service request description 1230, requestor 1240, service request timing (e.g., when the service is needed by) 1250, and a respond button 1260 (enabling an expert who can perform the service to contact the service requestor).

During the hiring process, the project that will be supported is determined. In one embodiment, the expert and/or the patron may unilaterally select the project that will be supported. In one embodiment, the expert may select from among the projects supported by the patron. In one embodiment, the patron may select from among the projects supported by the expert.

The patron and the expert also agree on the amount that will be paid to support the project (and the amount paid to the expert, if the expert is unable to donate all of the time spent performing the service to the project). A minimum predefined amount will always be allocated to the project.

In an embodiment, email messages with service requests can be sent to experts. In this embodiment, experts can sign up to receive service requests via email. The emails can be sent in real time (e.g., as the requests are made) or at predetermined times (e.g., at 8 am each day, including all services requests received over the past 24 hours). The respond button 1260 (or similar) can be included in the email to enable communication between the requestor and the expert. Text messages, or other messaging systems, may be used instead of emails. In this embodiment, the request may be for a specific task (e.g., giving the requestor a ride to the airport), and may include the price the requestor is willing to pay. Tasks may include local tasks (e.g., ride to the airport) or online tasks, (e.g., need help editing a document).

At step 314, the expert completes the service according to the agreement between the patron and the expert. After the service is completed, the respond button 1260 may be replaced by information about the expert who performed the service.

At step 316, the expert reports to the crowdfunding system that the service has been completed. In some embodiments, the patron may also report to the system that the service has been completed.

At step 318, the system moves the funding amount agreed upon from the patron's account to an account associated with the supported project. In situations where the expert will receive some of the funds from the patron, that amount is moved from the patron's account to the expert's account.

At step 320, the system determines if the project has received the required funding and, if so, notifies the project manager accordingly.

After the project has been funded, the project manager will then apply the funding to the completion of the project.

In some embodiments, users may want to sell products or other items and use the proceeds of the sale to support a project on the crowdfunding system. To this end, users may upload to the crowdfunding system information about products or other items they want to sell, accept offers and/or bids from other users, and effectuate the sale. The proceeds from the sale will then be applied to fund the project supported by the user selling the product. In an embodiment, the seller may support multiple projects, and the buyer will be prompted to select the project that will receive the funds from among the projects supported by the seller.

Embodiments of the subject matter and the functional operations described in this specification can be implemented in one or more of the following: digital electronic circuitry; tangibly-embodied computer software or firmware; computer hardware, including the structures disclosed in this specification and their structural equivalents; and combinations thereof. Such embodiments can be implemented as one or more modules of computer program instructions encoded on a tangible non-transitory program carrier for execution by, or to control the operation of, data processing apparatus (i.e., one or more computer programs). Program instructions may be, alternatively or additionally, encoded on an artificially generated propagated signal (e.g., a machine-generated electrical, optical, or electromagnetic signal) that is generated to encode information for transmission to suitable receiver apparatus for execution by a data processing apparatus. And the computer storage medium can be one or more of: a machine-readable storage device, a machine-readable storage substrate, a random or serial access memory device, and combinations thereof.

As used herein, the term "data processing apparatus" comprises all kinds of apparatuses, devices, and machines for processing data, including but not limited to, a programmable processor, a computer, and/or multiple processors or computers. Exemplary apparatuses may include special purpose logic circuitry, such as a field programmable gate array ("FPGA") and/or an application specific integrated circuit ("ASIC"). In addition to hardware, exemplary apparatuses may comprise code that creates an execution environment for the computer program (e.g., code that constitutes one or more of: processor firmware, a protocol stack, a database management system, an operating system, and a combination thereof).

The term "computer program" may also be referred to or described herein as a "program," "software," a "software application," a "module," a "software module," a "script," or simply as "code." A computer program may be written in any form of programming language, including compiled or interpreted languages, or declarative or procedural languages, and it can be deployed in any form, including as a standalone program or as a module, component, subroutine, or other unit suitable for use in a computing environment. Such software may correspond to a file in a file system. A program can be stored in a portion of a file that holds other programs or data. For example, a program may include one or more scripts stored in a markup language document; in a single file dedicated to the program in question; or in multiple coordinated files (e.g., files that store one or more modules, sub programs, or portions of code). A computer program can be deployed and/or executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as but not limited to an FPGA and/or an ASIC.

Computers suitable for the execution of the one or more computer programs include, but are not limited to, general purpose microprocessors, special purpose microprocessors, and/or any other kind of central processing unit ("CPU"). Generally, CPU will receive instructions and data from a read only memory ("ROM") and/or a random access memory ("RAM"). The essential elements of a computer are a CPU for performing or executing instructions and one or more memory devices for storing instructions and data. Generally, a computer will also include, or be operatively coupled to receive data from or transfer data to, or both, one or more mass storage devices for storing data (e.g., magnetic, magneto optical disks, and/or optical disks). However, a computer need not have such devices. Moreover, a computer may be embedded in another device, such as but not limited to, a mobile telephone, a personal digital assistant ("PDA"), a mobile audio or video player, a game console, a Global Positioning System ("GPS") receiver, or a portable storage device (e.g., a universal serial bus ("USB") flash drive).

Computer readable media suitable for storing computer program instructions and data include all forms of nonvolatile memory, media and memory devices. For example, computer readable media may include one or more of the following: semiconductor memory devices, such as erasable programmable read-only memory ("EPROM"), electrically erasable programmable read-only memory ("EEPROM") and/or and flash memory devices; magnetic disks, such as internal hard disks or removable disks; magneto optical disks; and/or CD ROM and DVD-ROM disks. The processor and the memory can be supplemented by, or incorporated in, special purpose logic circuitry.

To provide for interaction with a user, embodiments may be implemented on a computer having any type of display device for displaying information to a user. Exemplary display devices include, but are not limited to one or more of: projectors, cathode ray tube ("CRT") monitors, liquid crystal displays ("LCD"), light-emitting diode ("LED") monitors and/or organic light-emitting diode ("OLED") monitors. The computer may further comprise one or more input devices by which the user can provide input to the computer. Input devices may comprise one or more of: keyboards, a pointing device (e.g., a mouse or a trackball). Input from the user can be received in any form, including acoustic, speech, or tactile input. Moreover, crowdfunding may be provided to the user via any form of sensory crowdfunding (e.g., visual crowdfunding, auditory crowdfunding, or tactile crowdfunding). A computer can interact with a user by sending documents to and receiving documents from a device that is used by the user (e.g., by sending web pages to a web browser on a user's client device in response to requests received from the web browser).

Embodiments of the subject matter described in this specification can be implemented in a computing system that includes one or more of the following components: a back-end component (e.g., a data server); a middleware component (e.g., an application server); a frontend component (e.g., a client computer having a graphical user interface ("GUI") and/or a web browser through which a user can interact with an implementation of the subject matter described in this specification); and/or combinations thereof. The components of the system can be interconnected by any form or medium of digital data communication, such as but not limited to, a communication network. Non-limiting examples of communication networks include a local area network ("LAN") and a wide area network ("WAN"), e.g., the Internet.

The computing system may include clients and/or servers. The client and server may be remote from each other and interact through a communication network. The relationship of client and server arises by virtue of computer programs running on the respective computers and having a client-server relationship to each other.

Various embodiments are described in this specification, with reference to the detailed discussed above, the accompanying drawings, and the claims. Numerous specific details are described to provide a thorough understanding of various embodiments. However, in certain instances, well-known or conventional details are not described in order to provide a concise discussion. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the embodiments.

The embodiments described and claimed herein and drawings are illustrative and are not to be construed as limiting the embodiments. The subject matter of this specification is not to be limited in scope by the specific examples, as these examples are intended as illustrations of several aspects of the embodiments. Any equivalent examples are intended to be within the scope of the specification. Indeed, various modifications of the disclosed embodiments in addition to those shown and described herein will become apparent to those skilled in the art, and such modifications are also intended to fall within the scope of the appended claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

All references including patents, patent applications and publications cited herein are incorporated herein by reference in their entirety and for all purposes to the same extent as if each individual publication or patent or patent application was specifically and individually indicated to be incorporated by reference in its entirety for all purposes.

What is claimed is:

1. A computer program product encoded on one or more non-transitory computer storage media, the computer program product comprising instructions that when executed by one or more processors cause the one or more processors to perform operations comprising:

maintaining accounts for a plurality of project managers, a plurality of experts, and a plurality of patrons;

receiving information related to a project to be funded by at least one patron, the information including a project completion date and a funding goal;

associating the project information with an account of a project manager of the project;

transmitting the project information to a first user device for display to an expert based on matching the project information with information related to past projects supported by the expert using a machine learning technique;

receiving an indication that the expert supports the project;

receiving information related to a service offered by the expert;

transmitting the information related to the service to a second user device for display to a patron;

receiving an indication that the patron wants to hire the expert to perform the service;

receiving an indication that the expert has performed the service for the patron;

transferring an agreed monetary amount from an account of the patron to an account related to the project, the transferred monetary amount being added to a funding amount; and notifying the project manager when the funding goal has been reached;

wherein after the project is funded, the project manager uses the funding to staff and complete the project.

2. The computer program product of claim 1, further comprising the step of reviewing the project to determine if the project meets one or more requirements of the system.

3. The computer program product of claim 1, further comprising the step of receiving an indication that the patron supports the project.

4. The computer program product of claim 1, wherein the project is associated with an organization, wherein information related to the organization is transmitted to the first user device for display to the expert.

5. The computer program product of claim 1, further comprising the step of transferring an agreed monetary amount from an account of the patron to an account of the expert.

6. The computer program product of claim 1, wherein the transmission of the information related to the project to the first user device is in response to receiving a request from the expert to view the project.

7. The computer program product of claim 1, wherein the transmission of the information related to the service to the second user device is based on one or more prior interactions of the patron with the system.

8. The computer program product of claim 7, wherein the transmission of the information related to the service to the second user device is based on matching the information related to the service with information related to past experts hired by the patron using a machine learning technique.

9. A computer program product encoded on one or more non-transitory computer storage media, the computer program product comprising instructions that when executed by one or more processors cause the one or more processors to perform operations comprising:

maintaining accounts for a plurality of project managers, a plurality of experts, and a plurality of patrons;

receiving information related to a project to be funded by at least one patron, the information including a project completion date and a funding goal;

associating the project information with an account of a project manager of the project;

transmitting the project information to a first user device for display to an expert based on matching the project information with information related to past projects supported by the expert using a machine learning technique;

receiving an indication that the expert supports the project;

receiving information related to a service request from a patron;

transmitting the information related to the service request to the first user device for display to the expert;

receiving an indication that the expert is able to perform the service for the patron;

receiving an indication that the patron wants to hire the expert to perform the service;

receiving an indication that the expert has performed the service for the patron;

transferring an agreed monetary amount from an account of the patron to an account related to the project, the transferred monetary amount being added to a funding amount; and notifying the project manager when the funding goal has been reached;

wherein after the project is funded, the project manager uses the funding to staff and complete the project.

10. The computer program product of claim 9, further comprising the step of reviewing the project to determine if the project meets one or more requirements of the system.

11. The computer program product of claim 9, further comprising the step of receiving an indication that the patron supports the project.

12. The computer program product of claim 9, wherein the project is associated with an organization, wherein information related to the organization is transmitted to the first user device for display to the expert.

13. The computer program product of claim 9, further comprising the step of transferring an agreed monetary amount from an account of the patron to an account of the expert.

14. The computer program product of claim 9, wherein the transmission of the information related to the project to the first user device is in response to receiving a request from the expert to view the project.

* * * * *